United States Patent [19]

Murray, Jr.

[11] Patent Number: 4,600,277
[45] Date of Patent: Jul. 15, 1986

[54] TELESCOPE WITH MULTIPLE IMAGE-VIEWING ASSEMBLIES

[76] Inventor: Joseph E. Murray, Jr., 27 Alpine St., Malden, Mass. 02148

[21] Appl. No.: 579,687

[22] Filed: Feb. 13, 1984

[51] Int. Cl.[4] .................... G02B 23/02; G02B 7/02; F16L 37/24
[52] U.S. Cl. .................... 350/561; 285/402; 350/257; 350/571
[58] Field of Search .......... 350/257, 537–544, 350/546, 557–562, 567–573, 6–7, 13, 20; 403/343, 345; 285/361, 396, 402

[56] References Cited

U.S. PATENT DOCUMENTS

| | | | |
|---|---|---|---|
| 1,530,081 | 3/1925 | Humbrecht et al. | 350/543 |
| 1,837,993 | 12/1931 | Patterson | 350/507 |
| 2,086,372 | 7/1937 | Van Albada | 350/562 |
| 2,260,991 | 10/1941 | Gorey | 350/257 |
| 2,610,545 | 9/1952 | Davidson | 350/257 |
| 3,438,689 | 4/1969 | Wehr | 350/570 |
| 3,620,149 | 11/1971 | Ogihara | 350/257 |

FOREIGN PATENT DOCUMENTS

| | | | |
|---|---|---|---|
| 31151 | 7/1981 | European Pat. Off. | 350/257 |
| 97018 | 6/1983 | Japan | 350/410 |
| 16256 | of 1907 | United Kingdom | 350/567 |
| 323759 | 12/1971 | U.S.S.R. | 350/569 |
| 960709 | 9/1982 | U.S.S.R. | 350/410 |

OTHER PUBLICATIONS

Walker, B. "Pechan Derotation Prism–Application & Alignment Notes", Optical Engineering, 11/12-74, pp. G233-234.

*Primary Examiner*—William H. Punter
*Attorney, Agent, or Firm*—Lahive & Cockfield

[57] ABSTRACT

A telescope system having a main housing and at least two interchangeable viewing assemblies. The main housing contains an objective lens assembly for producing an inverted primary image, a field lens, and a combination power adjusting zoom and image erecting lens assembly for producing an erect secondary image. The interchangeable viewing assemblies are selectively coupled to the main housing to provide either straight through or offset viewing of the erect secondary image. The offset viewing assemblies contain an image-convertor to provide erect offset viewing. The viewing assemblies have bayonet couplers which engage a bayonet receiver on the main housing to provide detachable coupling. The main housing has a retractable lock pin which locks the selected viewing assembly to the main housing while the telescope system is in use.

3 Claims, 16 Drawing Figures

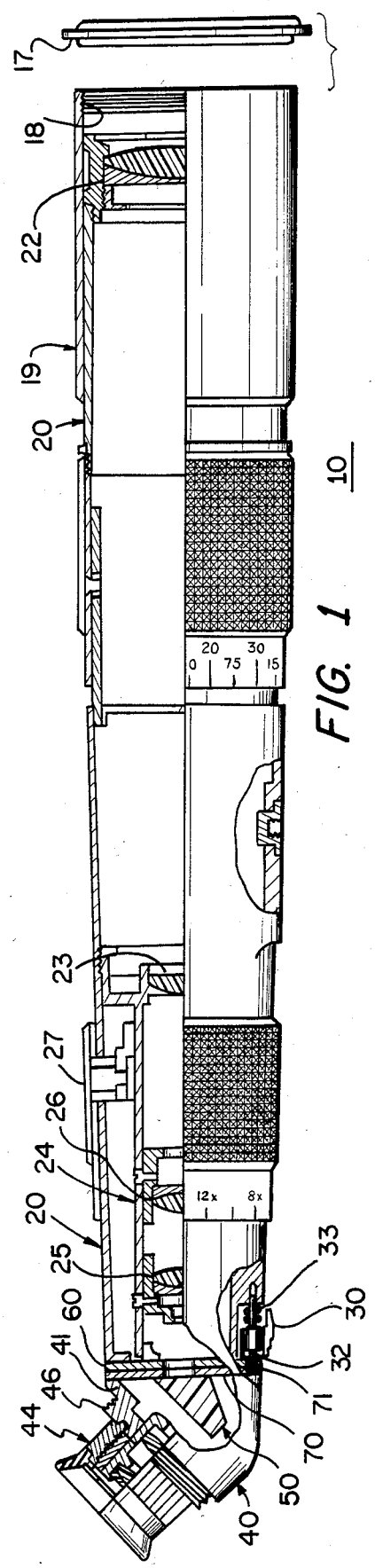
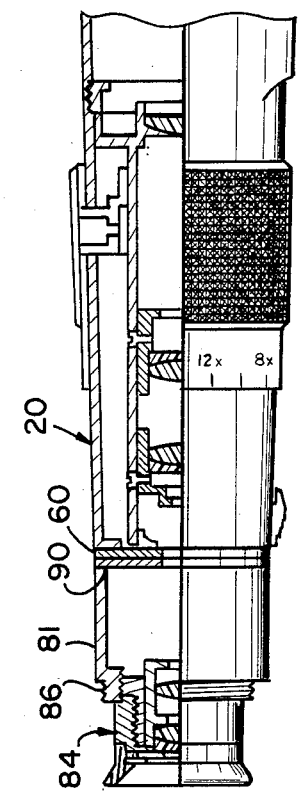
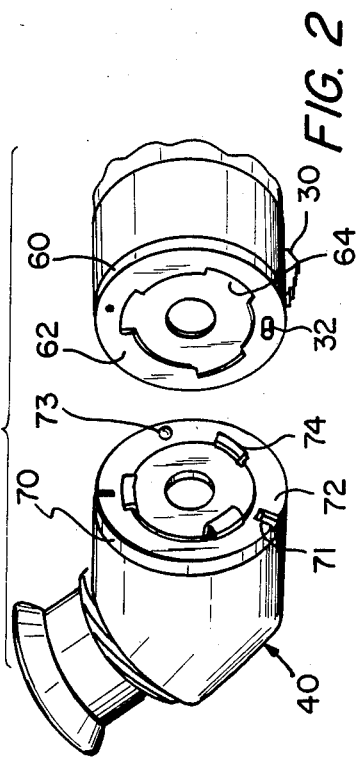
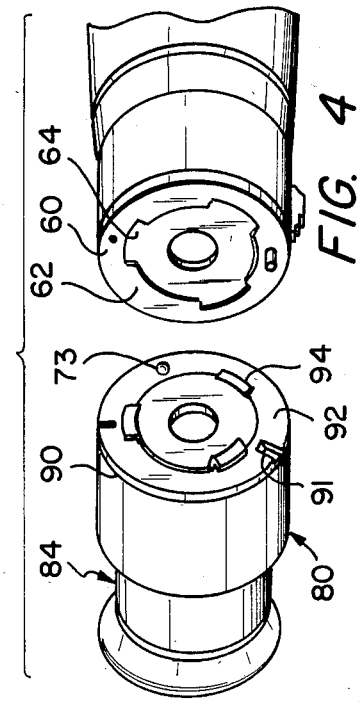
FIG. 1
FIG. 2
FIG. 3
FIG. 4

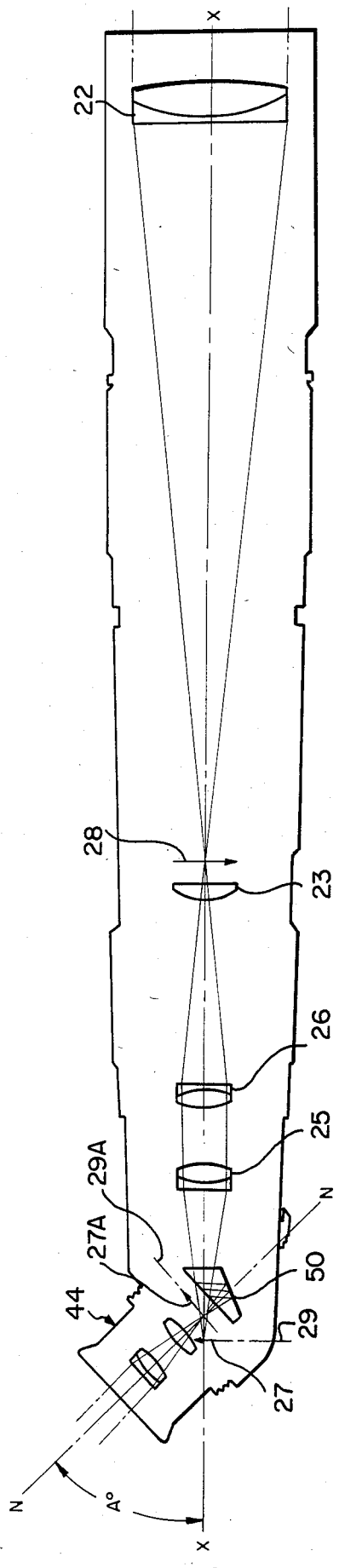
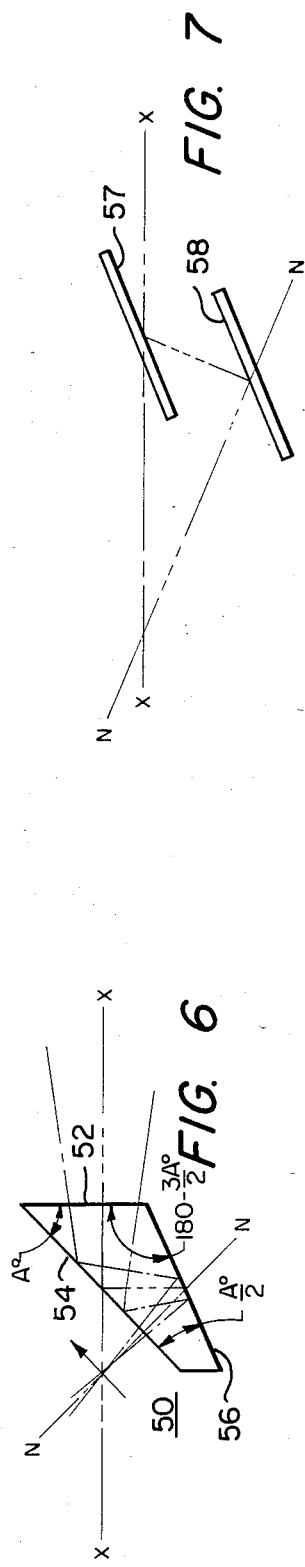
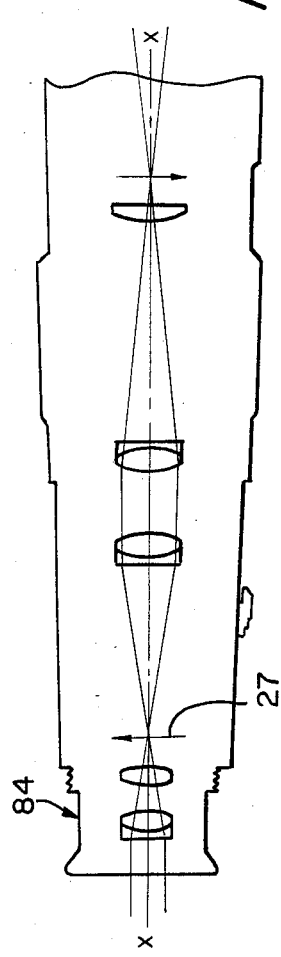
FIG. 5
FIG. 7
FIG. 6
FIG. 8

TELESCOPE WITH MULTIPLE IMAGE-VIEWING ASSEMBLIES

BACKGROUND OF THE INVENTION

This invention relates to telescope systems. Simple telescope systems typically have an objective imaging assembly and an ocular assembly that together provide a user with a magnified virtual image of a distant object which is upside down and backwards left to right. Objective imaging assemblies are composed of arrangements of either refracting lenses or reflecting mirrors. Objective imaging assemblies provide a real intermediate image of the object which is inverted about both horizontal and vertical axis so that it is upside-down and backwards left to right. Oculars provide a virtual image of the intermediate image with the same orientation as the intermediate image.

More complex telescope systems, known as terrestrial or spotting telescopes, have an erecting system located between the objective and the ocular that inverts the intermediate image about both the horizontal and vertical axes so that the final image appears upright and correct left to right.

Still other telescope systems have offset image convertors, usually comprised of a star diagonal prism or a mirror, for producing the final image in a focal plane that is offset by an angular amount from the focal plane of the intermediate image. The main purpose of these offset image convertors is to provide comfortable viewing for the telescope user when the objective assembly must be aimed in a direction which would otherwise produce uncomfortable viewing. Examples of such use would be astronomical viewing or birdwatching, where looking upward for long periods can cause substantial neck and shoulder fatigue. These offset image convertors generally also invert the intermediate image, but only about one axis. When these convertors are incorporated into a simple telescope, the resulting final image is upright but backwards left to right. When they are used in a terrestrial telescope, the resulting final image is upside-down but correct left to right.

It is desirable to provide an improved telescope system which provides optimum viewing comfort for a wide range of both astronomical and terrestrial uses while always producing an erect final image, upright and correct left to right.

Therefore, it is an object of the present invention to provide an improved telescope system which provides optimum viewing comfort by allowing viewing of the final image along a number of alternative axes depending only on the particular object of interest. It is a further object of this invention to provide an erect final image, upright and correct left to right, under all conditions regardless of which alternative viewing axis is chosen.

SUMMARY OF THE INVENTION

In general the present invention features a main imaging assembly comprising a main housing including means for supporting an objective imaging assembly positioned along a first reference axis for producing an inverted primary image in a first focal plane perpendicular to the first reference axis, a field lens positioned near the primary image to converge light toward an erecting assembly, and a combination power adjusting zoom and image-erecting lens assembly co-axial with the objective imaging assembly for producing an erect secondary image in a second focal plane perpendicular to the first reference axis.

The system further has at least two interchangeable viewing assemblies; a straight viewing assembly and at least one offset viewing assembly.

The straight viewing assembly is comprised of a straight viewer housing, a coupling means for detachably coupling the straight viewer housing to the main housing, and an ocular lens assembly supported by the straight viewer housing and positioned along the first reference axis to provide an erect view of the secondary image along the first reference axis.

The offset viewing assembly is comprised of an offset viewer housing, a coupling means for detachably coupling the offset viewer housing to the main housing, an offset image-converting means positioned within the offset viewer housing to provide for final image viewing along a second offset reference axis, and an ocular lens assembly supported by the offset viewer housing and positioned along the second offset reference axis to provide an erect view of the secondary image along the offset reference axis.

The offset image-converting means has first and second planar reflecting surfaces with the first surface arranged to reflect light transmitted from the erecting assembly, and the second surface arranged to reflect light incident from the first surface, to produce the offset image. In some embodiments the surfaces are mirrors. In the preferred embodiment, the image-converting means is a prism whose first planar reflecting surface is arranged to provide total internal reflection and whose second planar reflecting surface is coated with a metallized reflecting material. Two reflections are required in the image-converting means to maintain the erect orientation of the secondary image when delivered to the ocular lens assembly.

In the preferred embodiment, the coupling means for detachably coupling the viewer housings to the main housing includes a bayonet means for detaching or coupling the housings in response to relative rotation of one housing with respect to the other, and a spring-loaded, retractable lock pin to prevent relative rotation of the housings when coupled.

In the preferred embodiment, the ocular lens assemblies are detachably coupled to the offset and straight viewer housings to provide for interchangeable use of different ocular lens assemblies having different focal lengths or to allow a single ocular lens assembly to be used with either viewing assembly.

Among other advantages, the main imaging assembly and the interchangeable image viewing assemblies provide erect (upright and correct left to right) final images along alternative viewing axes relative to the first reference axis, so that the telescope system can be converted from a straight through viewing mode, with viewing co-axial with the first reference axis and most comfortable for observing many terrestrial objects, to an inclined viewing mode, with viewing offset from the first reference axis, and most comfortable for observing the sky, birds and the like.

Other advantages and features of the invention will be apparent from the following description of the preferred embodiments thereof, and from the claims.

DESCRIPTION OF THE PREFERRED EMBODIMENT

We turn now to the structure and operation of the preferred embodiment, first briefly describing the drawings thereof.

BRIEF DESCRIPTION OF THE DRAWINGS

FIG. 1 is a side elevation view, partially broken away, of a telescope system embodying the invention;

FIG. 2 is a perspective view of the offset viewing assembly of the telescope system shown in FIG. 1;

FIG. 3 is a side elevation view, partially broken away, of an alternative straight viewing assembly for the telescope system shown in FIG. 1;

FIG. 4 is a perspective view of the straight viewing assembly shown in FIG. 3;

FIG. 5 is a side elevation sectional view of the optical elements in the telescope system shown in FIG. 1;

FIG. 6 is an enlarged schematic diagram of the offset image-converting prism shown in FIG. 5;

FIG. 7 is a schematic diagram of an alternative offset image-converting mirror system;

FIG. 8 is a side elevation sectional view of the optical elements of the alternative straight viewing assembly shown in FIG. 3;

STRUCTURE

Figure 10:
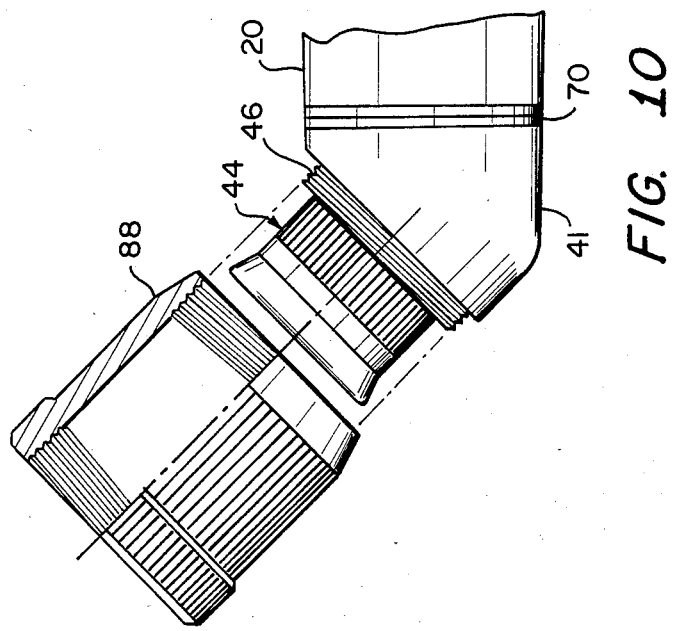
FIG. 10 is an enlarged side elevation view partially broken away, of the offset viewing assembly, the ocular assembly, and the camera adaptor.

A telescope system 10 embodying the invention is shown in FIG. 1. Telescope 10 has a main housing 20 which contains an objective lens imaging assembly 22, a field lens 23, and a combination zoom/image-erecting lens assembly 24 containing two lens pairs 25 and 26, whose positions within the main housing 20 can be varied by rotation of zoom ring 27. Telescope 10 has a built-in, movable sun shade 19 coaxially positioned around one end of main housing 20 and arranged to slide axially from a retracted position to an extended position. Sun shade 19 has a threaded portion 18 adapted for coupling optical accessories, filters, and objective lens cap 17. An offset image viewing assembly 40 is detachably coupled to main housing 20 and includes an offset viewer housing 41 which contains an offset image-converting prism 50 and supports an ocular lens assembly 44. Offset viewing assembly 40 is detachably coupled to main housing 20 by bayonet receiver 60 on main housing 20 and bayonet coupler 70 on viewer housing 41. A lock pin assembly, including lock release button 30, retractable lock pin 32, and lock spring 33, is positioned within main housing 20. When in locking position, the tip of lock pin 32 protrudes through bayonet receiver 60 and into lock slot 71 in bayonet coupler 70. FIG. 2 shows a perspective view of offset viewing assembly 40 detached from main housing 20.

An alternative straight viewing assembly 80 is shown in FIGS. 3 and 4. Straight viewing assembly 80 is detachably coupled to main housing 20 and includes a straight viewer housing 81 which supports an ocular lens assembly 84. Straight viewing assembly 80 is detachably coupled to main housing 20 by its bayonet coupler 90.

FIG. 5 illustrates the relationship of the optical elements in telescope 10. Within main housing 20, objective imaging lens assembly 22 is positioned along a first reference axis X for producing an inverted primary image 28 in a first focal plane perpendicular to reference axis X. Field lens 23 is positioned along reference axis X near primary image 28 to direct light toward zoom/image-erecting assembly 24. Zoom/image-erecting assembly 24 is positioned coaxially with objective lens assembly 22 and field lens 23 for producing an erect secondary image 27 in a second focal plane 29 perpendicular to reference axis X if no offset image-converting means is in place.

FIG. 5 shows the position of the optical elements in telescope 10 when offset image-viewing assembly 40 is coupled to main housing 20. Offset image-converting prism 50 is positioned between image-erecting assembly 24 and second focal plane 29 to produce offset secondary image 27A in a third focal plane 29A perpendicular to a second reference axis N offset by a predetermined angular amount, A degrees, from first reference axis X. Ocular lens assembly 44 is positioned along second reference axis N to provide a user of telescope system 10 with an erect, virtual image of offset secondary image 27A when viewing along reference axis N. In other embodiments, image-converting prism 50 can be positioned between second focal plane 29 and ocular lens assembly 44.

As shown in more detail in FIG. 6, offset image-converting prism 50, made from glass or any other suitable optical refracting material, has an input planar face 52 positioned along and perpendicular to first reference axis X and an output planar face 54 positioned along and perpendicular to second reference axis N. Output face 54 is angularly offset from input planar face 52 by an interior angle of A degrees, where A is greater than the critical angle for total internal reflection for the selected prism material in air. In the preferred embodiment the angular offset is approximately 45°. Prism 50 also has an intermediate planar face 56 that is angularly offset from output planar face 54 by an interior angle of A/2 degrees and from input planar face 52 by an interior angle of 180-3A/2 degrees. Intermediate planar face 56 has a light reflecting coating such as aluminum or silver to reflect light back toward the output face.

In other embodiments the offset image-converting means can be two mirror reflecting surfaces 57, 58, as illustrated in FIG. 7. As can be seen by comparing FIGS. 6 and 7, the prism embodiment has the advantage of allowing a more compact design than the mirror embodiment because the first reflecting surface can also be the output surface, thereby allowing the light path to be folded back on itself. The mirror embodiment has the advantage of allowing theoretical offset angles between 0° and 180°, limited in practice however by mirror and image size requirements, whereas the prism embodiment allows offset angles only between the critical angle and 90°, limited in practice to substantially less than 90° by prism size limitations.

FIG. 8 illustrates the relationship of the optical elements shown in FIG. 3 when straight viewing assembly 80 is coupled to main housing 20. Ocular lens assembly 84 is positioned along first reference axis X to provide a user of the telescope system with an erect, virtual image of secondary image 27 when viewing along reference axis X.

As best seen in FIGS. 1, 3, 9, and 10, viewer housings 41, 81 have, at one end, respectively, threads 46, 86 for interchangeably mounting a detachable protective ocular cap 48 or a camera adaptor 88. In the preferred embodiment, ocular lens assemblies 44, 84 are detachably coupled to viewer housings 41, 81 (shown in detail in FIG. 9) to provide interchangeability of different ocular assemblies.

Figure 11A:
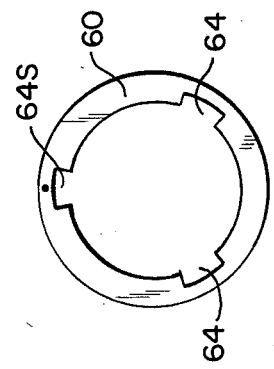
FIG. 11A is an end elevation view of the bayonet receiver shown in FIGS. 2 and 4.
Figure 9:
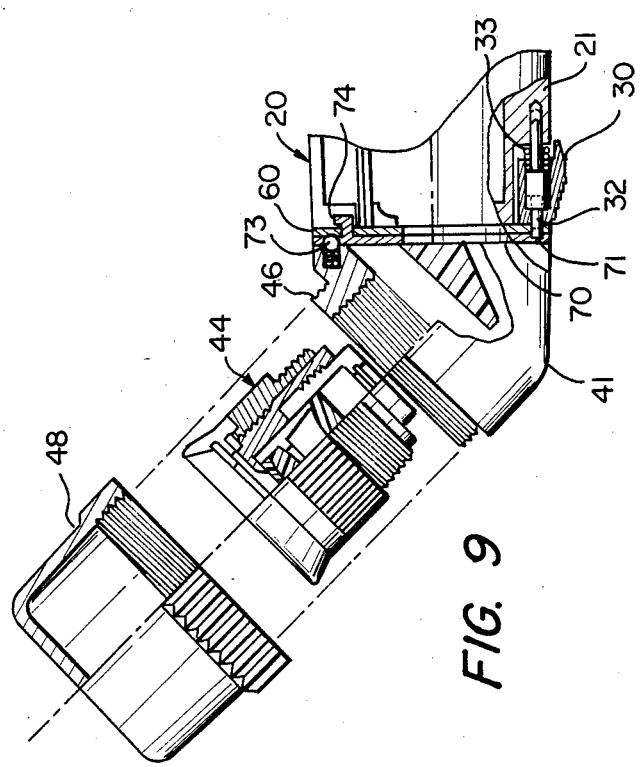
FIG. 9 is an enlarged side elevation view, partially broken away, of the offset viewing assembly and the ocular assembly of the telescope system shown in FIG. 1.

At the other end of viewer housings 41, 81 bayonet couplers 70, 90 are provided for detachable coupling to main housing 20. As best seen in FIGS. 2, 4, and 9, bayonet couplers 70, 90 each have lock slots 71, 91, a planar coupling plate 62, 92 and a set of three flanged tabs 74, 94. Bayonet receiver 60 has a substantially planar receiver plate 62 which includes three radial notches 64, sized to accomodate tabs 74, 94. In the preferred embodiment, one of the tabs 74, 94 (denoted by reference designation 74s in FIG. 11) and one corresponding notch 64 (denoted by reference designation 64s in FIG. 11A) are sized smaller (i.e. narrower in the circumferential direction) than the other two tabs and notches. The small notch 64s is sized to accomodate the small tab 74s, but not allow entry of the larger tabs. This arrangement ensures coupling of viewing assemblies 40, 80 in only one rotational orientation relative to main housing 20. Housing 20 has recessed areas behind radial notches 64 sufficient to accommodate flanged tabs 74, 94 and allow rotation of bayonet couplers 70, 90 relative to bayonet receiver 60. This rotation positions the flanged portions of bayonet tabs 74, 94 between housing 20 and coupler 60 thereby coupling housings 41, 81 to housing 20.

As best seen in FIG. 9, lock pin 32 is arranged for selectively controlled motion along an axis parallel to reference axis X between an extended position (shown in FIG. 9) and a retracted position. Pin 32 is normally biased toward its extended position by lock spring 33. Lock release button 30, mounted over pin 32, behind receiver 60 and extending through wall 21 of housing 20, is arranged to push pin 32 into its retracted position. Lock pin 32 is arranged to fit into lock slots 71, 91 of bayonet couplers 70, 90 when flanged tabs 74, 94 are fit into notches 64 and rotated.

In the preferred embodiment, housings 41, 81 also have spring loaded anti-rattle ball 73 arranged to extend slightly above the substantially planar surface of coupling plates 72, 92 of couplers 70, 90, and press against receiver 60 to eliminate any relative motion and rattling.

Figure 11:
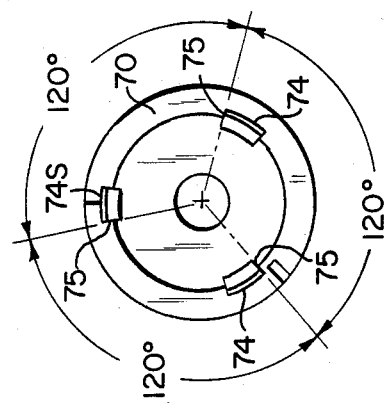
FIG. 11 is an end elevation view of the bayonet coupler shown in FIGS. 2 and 4.
Figure 13:
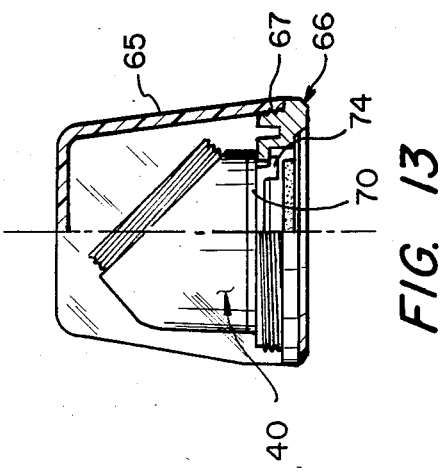
FIG. 13 is a side elevation view, partially broken away, of the offset viewing assembly in the protective case shown in FIG. 12.
Figure 14:
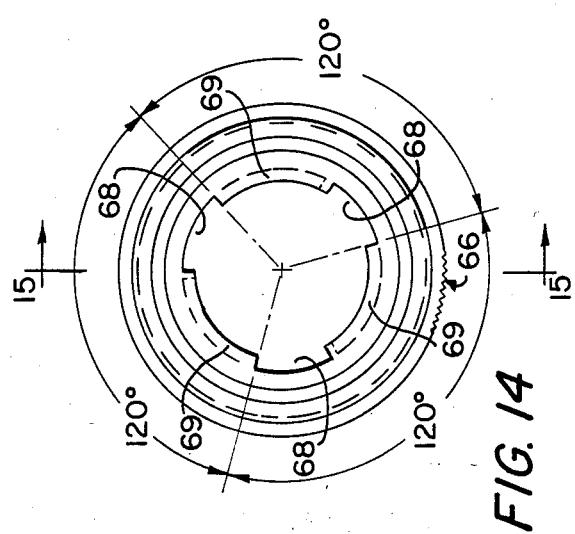
FIG. 14 is a plan view of the storage cover shown in FIG. 12.
Figure 12:
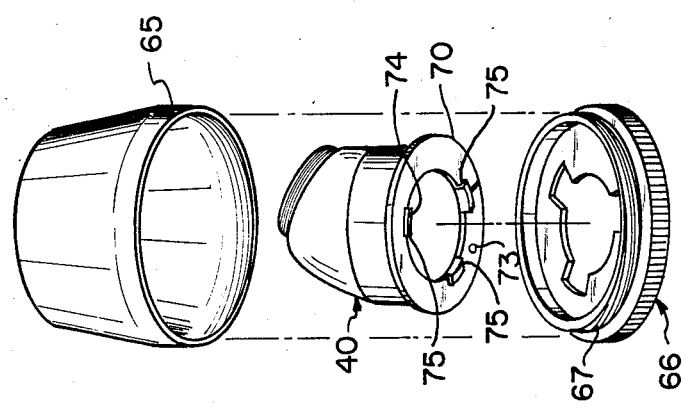
FIG. 12 is a perspective view of the offset viewing assembly and its storage cover and protective case.
Figure 15:
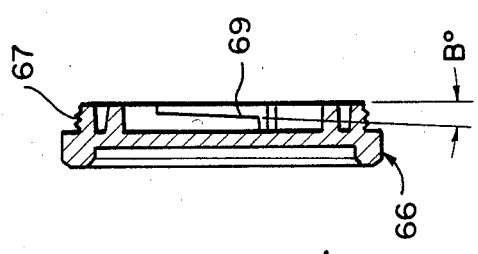
FIG. 15 is a side elevation sectional view of the storage cover shown in FIG. 14.

In the preferred embodiment, each of the three flanged tabs 74, 94 has one edge 75 positioned 120° from the corresponding edge of each of the other two tabs, as shown in FIG. 11. This equally spaced arrangement of three edges 75 allows viewer assemblies 40, 80 to be coupled to the storage cover 66 of a protective case 65, as shown in FIGS. 12 and 13, for safe storage. Storage cover 66 a central axis (as indicated by the dash-dot line in FIG. 13), and a receiver member having a substantially planar surface perpendicular to the cover axis and including three identical notches 68 and three identical overhanging wedge-shaped segments 69 arranged 120° apart as shown in FIGS. 12, 14, and 15. This configuration allows bayonet couplers 70, 90 to be coupled to storage cover 66 in any of three orientations by fitting flanged tabs 74, 94 into notches 68 and rotating viewer assembly 40, 80 clockwise relative to cover 66 until tab edges 75 are frictionally engaged by axially extending helical surfaces of wedge-shaped segments 69. In the preferred embodiment, antirattle ball 73 of couplers 70, 90 also presses against the surface of segment 69 to further secure viewer assembly 40, 80 to storage cover 66. Protective case 65 is then placed over viewer assembly 40, 80 and screwed onto threads 67 of storage cover 66.

OPERATION

A user of telescope system 10 begins by choosing the viewer assembly best suited for comfortable observation of the chosen subject. Offset viewing assembly 40 and straight viewing assembly 80 are both coupled to main housing 20 by the same manipulation. Specifically, the user aligns the chosen viewing assembly, 40 or 80, with main housing 20 so that flanged tabs 74, 94 of bayonet couplers 70, 90 are positioned to enter notches 64 of bayonet receiver 60. Bayonet coupler 70, 90 is then pressed against bayonet receiver 60, whereby flanged tabs 74, 94 enter notches 64 and lock pin 32 is pushed back to its retracted position by surface 72, 92 of bayonet coupler 70, 90 as shown in FIGS. 2 and 4. In the preferred embodiment, spring loaded anti-rattle ball 73 is pressed against its spring by surface 62 of receiver 60. Viewing assembly 40, 80 is then rotated clockwise with respect to main housing 20 until flanged tabs 74, 94 are hooked behind bayonet receiver 60, and lock slot 71, 91 aligns with lock pin 32 allowing lock pin 32 to be moved by lock spring 33 to its extended position and to enter lock slot 71, 91. Thus viewing assembly 40, 80 is axially locked to housing 20 by tabs 74, 94 and rotationally locked by pin 32.

The user unlocks the viewing assembly 40, 80 from main housing 20 by pushing lock release button 30 to retract lock pin 32, rotating viewing assembly 40, 80 counterclockwise until flanged tabs 74, 94 align with notches 64, and separating bayonet coupler 70, 90 axially from bayonet receiver 60.

When straight viewing assembly 80 is locked to main housing 20, a user of telescope system 10 is provided with an erect, magnified view of a distant object along reference axis X, and when offset viewing assembly 40 is locked to main housing 20, the user is provided with an erect, magnified view of a distant object along a second axis N which is offset by A degrees from first reference axis X.

As shown in FIG. 9, a telescope user may choose to interchange oculars 44, 84 or replace them with different oculars in viewing assemblies 40, 80. As shown in FIG. 10, the user may choose to connect a camera to telescope system 10 by attaching camera adaptor 88 to threads 46, 86 of either viewing assembly 40, 80.

OTHER EMBODIMENTS

Other embodiments are within the following claims. For example, the objective lens assembly could be a concave reflecting mirror. In other embodiments the image-erecting assembly could be a single lens with no power adjusting capability.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A telescope system comprising:
   A. a main imaging assembly having an objective imaging assembly positioned along a first reference axis for producing an inverted primary image in a first focal plane, an image-erecting lens assembly co-axial with said objective imaging means for producing an erect secondary image in a second focal plane perpendicular to said first reference axis, and a main housing including means for supporting said objective imaging assembly and said image-erecting lens assembly, and
   B. at least two image-viewing assemblies and associated means for detachably coupling said image-viewing assemblies to said main housing, each of said image-viewing assemblies having an associated viewing reference axis and including means for providing a user of said telescope system with an erect view of said secondary image along its associated viewing reference axis, wherein one of said viewing reference axes is an offset viewing reference axis which is offset from said first reference axis by an angle of A degrees and the image-viewing assembly associated with said offset viewing reference axis comprises an offset viewer housing, coupling means for detachably connecting said offset viewer housing to said main housing, an image-converting means for producing an offset image identical to said secondary image in a third focal plane offset by an angle A degrees from said second focal plane, and a viewing lens assembly positioned to provide viewing of said offset image along said offset viewing reference axis, and wherein a second of said viewing reference axes is coaxial with said first reference axis, and the image-viewing assembly associated with said second viewing reference axis comprises a straight-through viewer housing, coupling means for detachably connecting said straight-through viewer housing to said main housing, and a viewing lens assembly positioned to provide direct viewing of said secondary image along said first reference axis further comprising a bayonet coupling means for detachably coupling said main housing to said viewer housing in response to relative rotation of one of said housings with respect to the other of said housings, wherein said bayonet coupling means includes:
   A. a receiver plate affixed to said main housing having a substantially planar surface perpendicular to said first reference axis and including at least three notches extending axially therein, and
   B. a coupling plate affixed to said viewer housing having a substantially planar surface perpendicular to said first reference axis and adjacent to said planar surface of said receiver plate when said main housing and said viewer housing are coupled, and including at least three flanged tabs extending axially from said coupling plate, each of said tabs being associated with one of said notches, wherein each of said tabs and notches are radially equidistant from said first reference axis when said housings are coupled, and each tab and its associated notch has a first edge equally spaced angularly with respect to the corresponding edges of the other tabs and associated notches around said first reference axis, and at least one of said tabs and associated notches has a different circumferential dimension than the other tabs and associated notches.

2. A telescope system according to claim 1 wherein said bayonet coupling means further includes an anti-rattle means for positionally stabilizing said viewer housing with respect to said main housing when said viewer housing is coupled to said main housing, said anti-rattle means comprising a spring biased ball positioned to extend from said planar surface of said coupling plate and adapted to exert a force between said main housing and said viewing housing when said viewing housing is coupled to said main housing.

3. A telescope system according to claim 1 wherein the tips of said tabs distal from said coupling plate include portions extending radially away said first reference axis, and further comprising at least one cover member and means for detachably coupling said image-viewing assemblies to said cover member, wherein said cover member is characterized by a cover axis and includes a receiver member affixed thereto, said receiver member including a substantially planar surface perpendicular to said cover axis and including a set of cover notches extending axially therein, each of said cover notches being associated with one of said tabs of one of said viewing assemblies and each of said cover notches being the same distance from said cover axis as the tabs in said one viewing assembly is from said first reference axis, and wherein each of said cover notches has a circumferential dimension at least equal to the circumferential dimension of the longest of said associated tabs, and wherein said cover member further includes in association with each of said cover notches, an axially extending helical surface adapted for simultaneous interfering engagement with radially extending tip portions of said first edges of said associated tabs.

* * * * *